(12) United States Patent
De Witt et al.

(10) Patent No.: US 8,987,646 B2
(45) Date of Patent: Mar. 24, 2015

(54) PIXEL AND METHOD

(75) Inventors: Yannick De Witt, Aartselaar (BE); Tom A. Walschap, Bornem (BE); Tomas Geurts, Haasrode (BE)

(73) Assignee: Semiconductor Components Industries, LLC, Phoenix, AZ (US)

( * ) Notice: Subject to any disclaimer, the term of this patent is extended or adjusted under 35 U.S.C. 154(b) by 822 days.

(21) Appl. No.: 13/157,311

(22) Filed: Jun. 10, 2011

(65) Prior Publication Data
US 2012/0312967 A1     Dec. 13, 2012

(51) Int. Cl.
| | |
|---|---|
| H01L 27/146 | (2006.01) |
| H04N 5/217 | (2011.01) |
| H04N 5/378 | (2011.01) |
| H04N 5/355 | (2011.01) |
| H04N 5/357 | (2011.01) |
| H04N 5/3745 | (2011.01) |

(52) U.S. Cl.
CPC ........... *H04N 5/3575* (2013.01); *H04N 5/3745* (2013.01); *H04N 5/378* (2013.01)
USPC ................. 250/208.1; 250/214 A; 348/301; 348/308; 257/292

(58) Field of Classification Search
USPC ....... 250/208.1, 214 A, 214 R; 348/294, 300, 348/301, 302, 308, E05.091; 257/225, 231, 257/232, 233, 290, 291, 292, E27.132, 257/E27.133
See application file for complete search history.

(56) References Cited

U.S. PATENT DOCUMENTS

| | | | | |
|---|---|---|---|---|
| 5,625,210 | A * | 4/1997 | Lee et al. | 257/292 |
| 5,892,540 | A * | 4/1999 | Kozlowski et al. | 348/300 |
| 5,959,747 | A * | 9/1999 | Psaltis et al. | 359/22 |
| 6,072,608 | A * | 6/2000 | Psaltis et al. | 359/22 |
| 6,438,276 | B1 * | 8/2002 | Dhuse et al. | 382/312 |
| 6,566,697 | B1 * | 5/2003 | Fox et al. | 257/292 |
| 6,855,937 | B2 * | 2/2005 | Tashiro et al. | 250/370.11 |
| 7,224,389 | B2 * | 5/2007 | Dierickx | 348/308 |
| 7,282,685 | B2 * | 10/2007 | Boemler | 250/208.1 |
| 7,476,836 | B2 * | 1/2009 | Boemler | 250/208.1 |
| 7,626,622 | B2 * | 12/2009 | Kasuga et al. | 348/300 |
| 7,701,493 | B2 * | 4/2010 | Mauritzson | 348/241 |
| 7,750,958 | B1 * | 7/2010 | Dierickx | 348/294 |
| 7,825,967 | B2 * | 11/2010 | Panicacci | 348/257 |
| 7,852,385 | B2 * | 12/2010 | Mauritzson | 348/241 |
| 8,059,173 | B2 * | 11/2011 | Walschap et al. | 348/241 |
| 2002/0190215 | A1 * | 12/2002 | Tashiro et al. | 250/370.11 |
| 2003/0011694 | A1 * | 1/2003 | Dierickx | 348/308 |
| 2005/0018065 | A1 * | 1/2005 | Tashiro et al. | 348/308 |
| 2006/0262055 | A1 * | 11/2006 | Takahara | 345/81 |
| 2008/0006764 | A1 * | 1/2008 | Boemler | 250/208.1 |
| 2009/0021619 | A1 * | 1/2009 | Kasuga et al. | 348/300 |
| 2009/0128677 | A1 * | 5/2009 | Kozlowski | 348/308 |
| 2009/0256060 | A1 * | 10/2009 | Meynants et al. | 250/208.1 |
| 2010/0020213 | A1 * | 1/2010 | Mauritzson | 348/294 |

(Continued)

OTHER PUBLICATIONS

Comparison of Global Shutter Pixels for CMOS Image Sensors, by Stefan Lauxtermann, Adam Lee, John Stevens, and Atul Joshi (Teledyne Imaging Sensors), Image Sensor Workshop, 2007, pp. 82-85, Ogunquit, ME.

(Continued)

*Primary Examiner* — John Lee
(74) *Attorney, Agent, or Firm* — Rennie William Dover

(57) ABSTRACT

In accordance with an embodiment, a pixel includes a first stage coupled to a second stage. The second stage includes a sampling capacitor and a subtraction capacitor.

18 Claims, 5 Drawing Sheets

(56) References Cited

U.S. PATENT DOCUMENTS

| | | |
|---|---|---|
| 2010/0072350 A1 | 3/2010 | De Wit et al. |
| 2010/0079632 A1* | 4/2010 | Walschap et al. ............. 348/294 |
| 2010/0271517 A1* | 10/2010 | De Wit et al. ................ 348/294 |
| 2011/0006311 A1* | 1/2011 | Hadwen et al. ................. 257/84 |
| 2011/0062314 A1* | 3/2011 | Doege ....................... 250/214 R |
| 2011/0192959 A1* | 8/2011 | Hynecek .................... 250/214 P |
| 2012/0175499 A1* | 7/2012 | Meynants et al. .......... 250/208.1 |
| 2012/0312967 A1* | 12/2012 | De Wit et al. ............. 250/214 A |
| 2013/0032697 A1* | 2/2013 | De Wit ...................... 250/208.1 |

OTHER PUBLICATIONS

Intra-Pixel Reset Noise Cancellation, by R. Merrill, (Foveon Inc.), Image Sensor Workshop, 2001, 4 unnumbered pages, Lake Tahoe, Nevada, USA.

Two-Stage Charge Transfer Pixel Using Pinned Diodes for Low-Noise Global Shutter Imaging, by Keita Yasutomi, Shinya Itoh, Shoji Kawahito, and Toshihiro Tamura (Research Institute of Electronics, Shizuoka University, Japan and Photron Ltd.), Image Sensor Workshop, 2009, 4 unnumbered pages, Bergen, Norway.

* cited by examiner

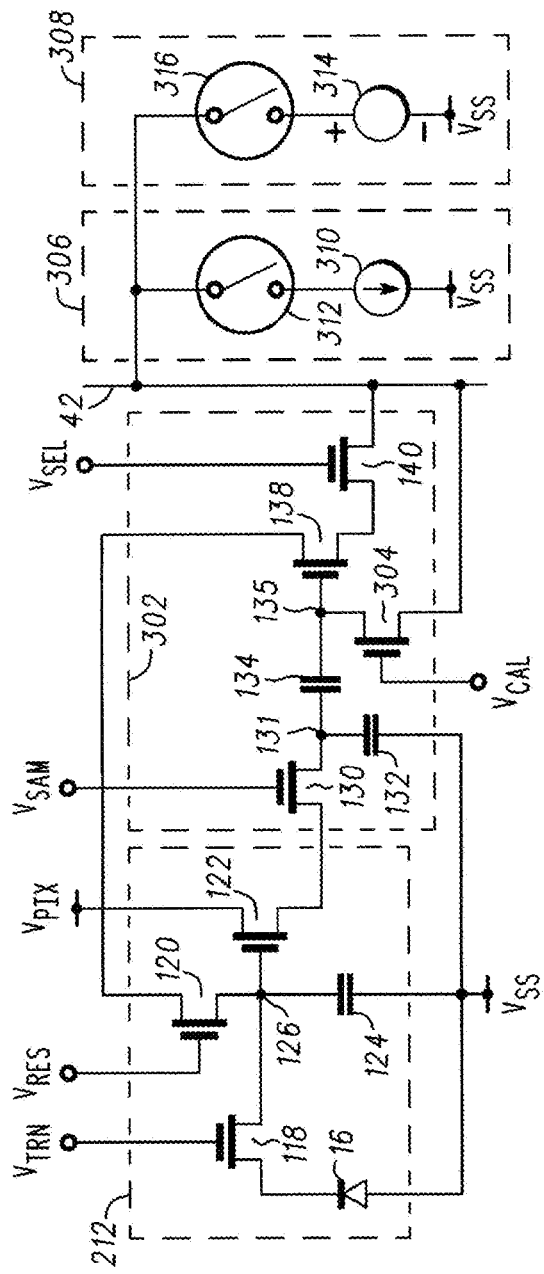
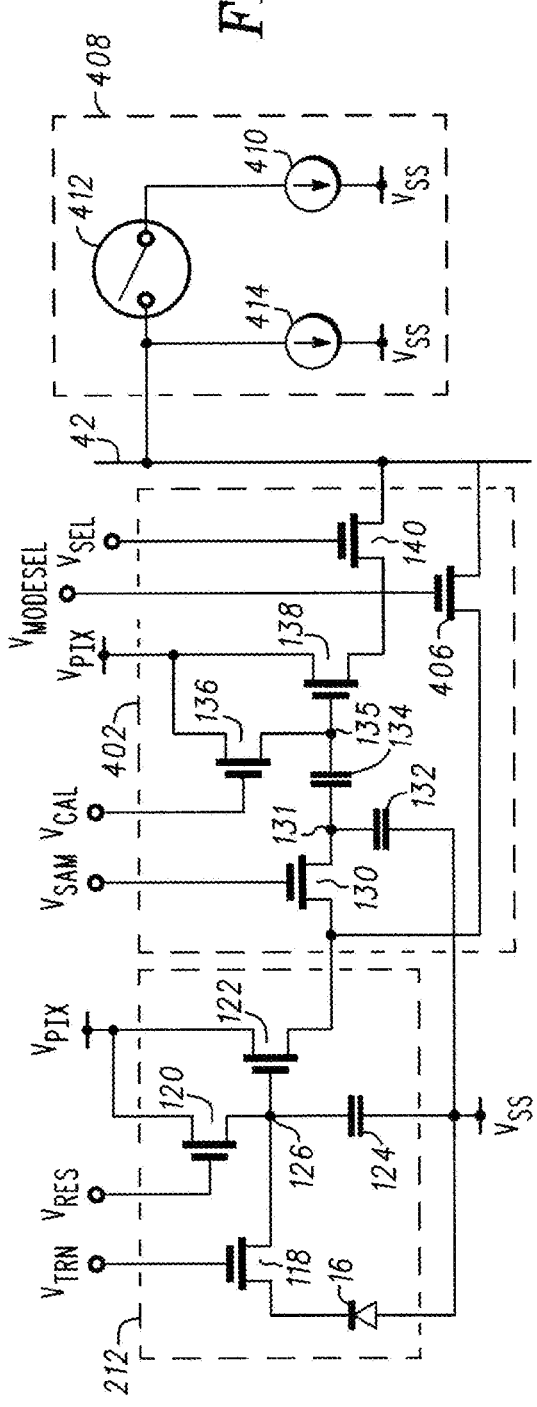

PIXEL AND METHOD

BACKGROUND

The present invention relates, in general, to electronics and, more particularly, to image sensors.

In the past, the electronics industry used solid-state image sensors to form pixels in camera systems. The pixels were configured into an array of rows and columns and contained photosensitive elements. Image sensors are disclosed in U.S. Pat. No. 5,625,210 issued to Paul P. Lee et al. on Apr. 29, 1997, U.S. Pat. No. 6,566,697 B1 issued to Eric C. Fox et al. on May 20, 2003, and U.S. Pat. No. 7,750,958 B1 issued to Bart Dierickx on Jul. 6, 2010. A drawback with these systems is their performance degradation caused by parasitic storage node leakage (PSNL) and parasitic light sensitivity (PLS).

Accordingly, it would be advantageous to have an image sensor and method for operating the image sensor having improved performance parameters. In addition, it is desirable for the method and circuit to be cost and time efficient to implement.

BRIEF DESCRIPTION OF THE DRAWINGS

The present invention will be better understood from a reading of the following detailed description, taken in conjunction with the accompanying drawing figures, in which like reference characters designate like elements and in which:

FIG. 6 is a circuit schematic of a pixel in accordance with another embodiment of the present invention;

FIG. 8 is a circuit schematic of a pixel in accordance with another embodiment of the present invention.

Figure 1:
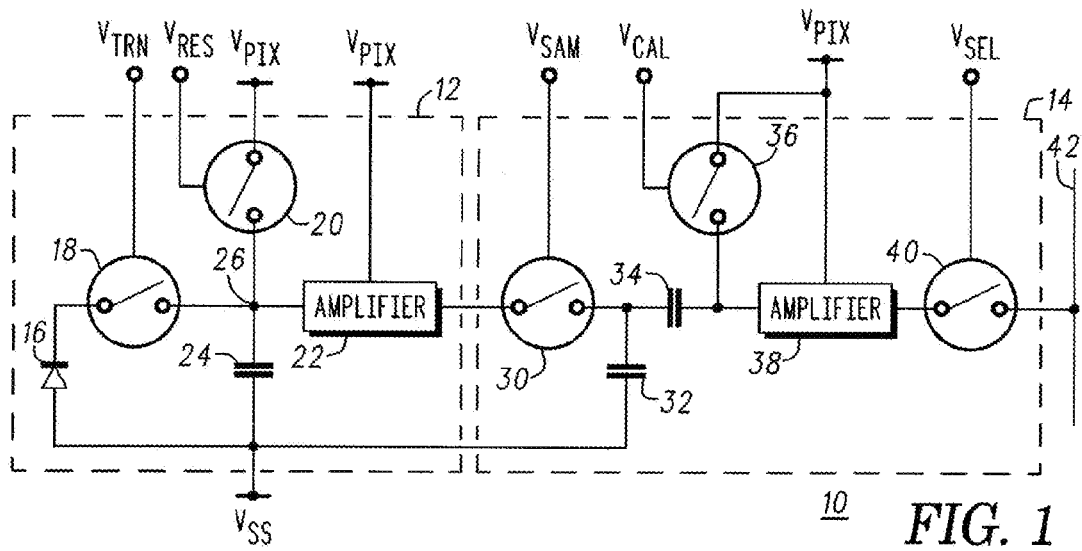
FIG. 1 is a circuit schematic of a pixel in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or an anode of a diode, and a control electrode means an element of the device that controls current flow through the device such as a gate of an MOS transistor or a base of a bipolar transistor. Although the devices are explained herein as certain N-channel or P-channel devices, or certain N-type or P-type doped regions, a person of ordinary skill in the art will appreciate that complementary devices are also possible in accordance with embodiments of the present invention. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated. It is well established in the art that variances of up to about ten percent (10%) (and up to twenty percent (20%) for semiconductor doping concentrations) are regarded as reasonable variances from the ideal goal of exactly as described.

It should be noted that a logic zero voltage level ($V_L$) is also referred to as a logic low voltage and that the voltage level of a logic zero voltage is a function of the power supply voltage and the type of logic family. For example, in a Complementary Metal Oxide Semiconductor (CMOS) logic family a logic zero voltage may be thirty percent of the power supply voltage level. In a five volt Transistor-Transistor Logic (TTL) system a logic zero voltage level may be about 0.8 volts, whereas for a five volt CMOS system, the logic zero voltage level may be about 1.5 volts. A logic one voltage level ($V_H$) is also referred to as a logic high voltage level and, like the logic zero voltage level, the logic high voltage level also may be a function of the power supply and the type of logic family. For example, in a CMOS system a logic one voltage may be about seventy percent of the power supply voltage level. In a five volt TTL system a logic one voltage may be about 2.4 volts, whereas for a five volt CMOS system, the logic one voltage may be about 3.5 volts.

DETAILED DESCRIPTION

Generally the present invention provides an image sensor pixel and a method for operating the image sensor.

FIG. 1 is a circuit schematic of a pixel 10 in accordance with an embodiment of the present invention. Pixel 10 is comprised of a stage 12 connected to a stage 14. Stage 12 may be referred to as in input stage, a front end stage, or a front end and stage 14 may be referred to as an output stage, a backend stage, or a backend. In accordance with an embodiment, front end 12 includes a photodiode 16, a transfer switch 18, a reset switch 20, an amplifier 22, and a memory element 24. Preferably, photodiode 16 is a pinned photodiode capable of being fully depleted at a depletion voltage $V_{PIN}$. Switches 18 and 20 each have a control terminal and a pair of current carrying terminals. Transfer switch 18 has a current carrying terminal connected to a cathode of photodiode 16 and a current carrying terminal commonly connected to a current carrying terminal of reset switch 20, an input terminal of amplifier 22, and a terminal of memory element 24 to form a floating diffusion node 26. The other current carrying terminal of reset switch 20 is coupled for receiving a source of operating potential such as, for example, $V_{PIX}$. Amplifier 22 has an input terminal coupled for receiving, for example, source of operating potential $V_{PIX}$. The control terminal of transfer switch 18 is coupled for receiving a control signal $V_{TRN}$ and the control terminal of reset switch 20 is coupled for receiving a control signal $V_{RES}$. The cathode of photodiode 16 and the other terminal of memory element 24 are coupled for receiving a source of operating potential $V_{SS}$. By way of example, source of operating potential $V_{SS}$ is a ground potential.

Back end 14 includes a sampling switch 30, a sampling element 32, a subtraction element 34, a calibration switch 36, an amplifier 38, and a selection switch 40. Sampling switch 30 has a current carrying terminal connected to an output terminal of amplifier 22 and a current carrying terminal commonly connected to terminals of sampling element 32 and subtraction element 34, and a control electrode coupled for receiving a sampling signal $V_{SAM}$. Amplifier 38 has an input terminal commonly connected to another terminal of subtraction element 34, an input terminal coupled for receiving source of operating potential $V_{PIX}$, and an output terminal. Calibration switch 36 has a current carrying terminal commonly connected to the commonly connected input terminal of amplifier 38 and the terminal of subtraction element 34, a current carrying terminal coupled for receiving a source of operating potential such as, for example, $V_{PIX}$, and a control electrode coupled for receiving a calibration signal $V_{CAL}$. Selection switch 40 has a current carrying terminal coupled to the output terminal of amplifier 38, a current carrying terminal coupled to a column conductor 42, and a control electrode coupled for receiving a control signal $V_{SEL}$.

Figure 2:
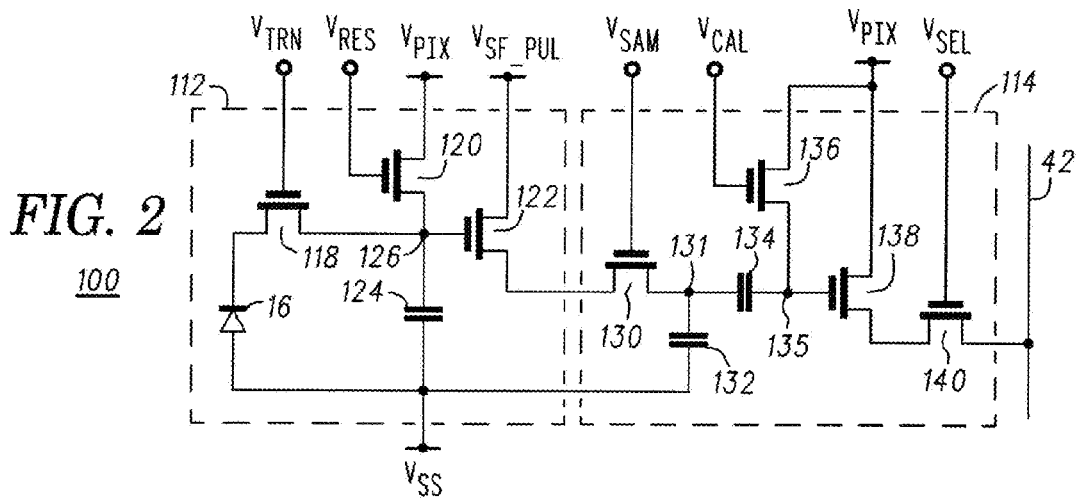
FIG. 2 is a circuit schematic of a pixel in accordance with another embodiment of the present invention.

FIG. 2 is a circuit schematic of a pixel 100 in accordance with another embodiment of the present invention. Pixel 100 is comprised of a front end stage 112 connected to a back end stage 114. In accordance with an embodiment, front end stage 112 includes a photodiode 16, a transfer transistor 118, a reset transistor 120, a transistor 122 configured as a source follower, and a capacitor 124. Preferably, photodiode 16 is a pinned photodiode capable of being fully depleted at a depletion voltage $V_{PIN}$. Transistors 118, 120, and 122 each have a control electrode and a pair of current carrying electrodes. As discussed above, the control electrode of a field effect transistor may be a gate electrode and the current carrying electrodes of the field effect transistor may be the drain and source electrodes. By way of example, transfer transistor 118 has a drain electrode connected to a cathode of photodiode 16 and a source electrode commonly connected to the source electrode of reset transistor 120, a gate electrode of source follower transistor 122, and a terminal of capacitor 124 to form a floating diffusion node 126. The drain electrode of reset transistor 120 is coupled for receiving a source of operating potential such as, for example, $V_{PIX}$. The gate electrode of transfer transistor 118 is coupled for receiving a control signal $V_{TRN}$ and the gate electrode of reset transistor 120 is coupled for receiving a control signal $V_{RES}$. The cathode of photodiode 16 and the other terminal of capacitor 124 are coupled for receiving a source of operating potential $V_{SS}$. By way of example, source of operating potential $V_{SS}$ is a ground potential.

Back end 114 includes a sampling transistor 130, a sampling capacitor 132, a subtraction capacitor 134, a calibration transistor 136, a transistor 138 configured as a source follower, and a selection transistor 140. In accordance with embodiments in which transistors 130, 136, 138, and 140 are field effect transistors, such as, for example, Metal Oxide Semiconductor field effect transistors, they each have a gate electrode, a drain electrode, and a source electrode. Sampling transistor 130 has a drain electrode connected to a source electrode of source follower transistor 122, a source electrode commonly connected to terminals of sampling capacitor 132 and subtraction capacitor 134 to form a node 131, and a gate electrode coupled for receiving a sampling signal $V_{SAM}$. Source follower transistor 138 has a gate electrode commonly connected to a terminal of subtraction capacitor 134 and a source electrode of calibration transistor 136 to form a node 135, a drain electrode coupled for receiving a source of operating potential $V_{PIX}$, and a source electrode. Calibration transistor 136 has a source electrode commonly connected to the commonly connected gate electrode of transistor 138 and the terminal of subtraction capacitor 134, i.e., to node 135. In addition, calibration transistor 136 has a gate electrode coupled for receiving a calibration signal $V_{CAL}$ and a drain electrode coupled for receiving a source of operating potential such as, for example, potential $V_{PIX}$. Selection transistor 140 has a drain electrode connected to the source electrode of source follower transistor 138, a source electrode coupled to a column conductor 42, and a control electrode coupled for receiving a control signal $V_{SEL}$.

In operation, after integration, floating diffusion node 126 is reset and sampling capacitor 132 is precharged by pulsing the drain electrode of source follower transistor 122 with a pulsed signal $V_{SF\_PUL}$. After precharging sampling capacitor 132, the buffered value on sampling capacitor 132 at node 131 is sampled. The terminal of subtraction capacitor 134 that is connected to node 135 is connected to source of potential $V_{PIX}$ through calibration transistor 136. The voltage at node 135 is sampled by turning off calibration transistor 136.

The charge on photodiode 16 is transferred to floating diffusion node 126 by turning on transfer transistor 118 (a snapshot) and maintaining sampling transistor 130 is an on state.

Sampling capacitor 132 is again precharged so that source follower transistor 138 is conducting and the signal value across sampling capacitor 132 is sampled. In response, the correlated double sampling result appears at the terminal of subtraction capacitor 134 connected to node 135. Thus the output voltage Vout is equal to the difference between signals $V_{PIX}$ and $V_{SIGNAL}$, i.e., kTC noise of floating diffusion capacitance 124 and FPN of front end stage 112 is absent. During readout of node 135, all photodiodes of the whole pixel array can be reset by using the reset transistors 120 and the transfer transistors 118 to start capturing the next frame while reading out the previous frame, i.e., pipelined operation.

Figure 3:
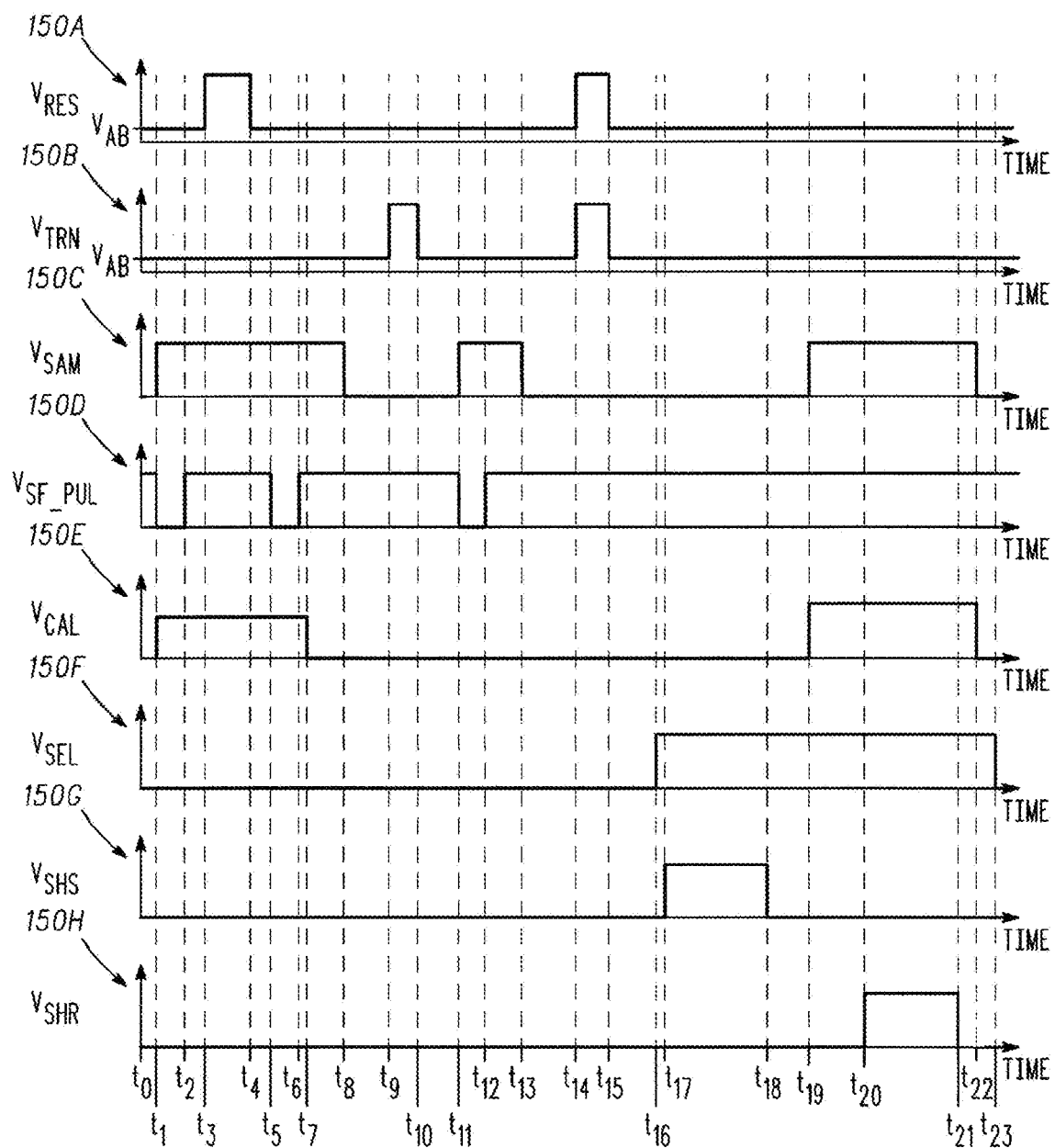
FIG. 3 is a timing diagram in accordance with another embodiment of the present invention.

FIG. 3 is a timing diagram 150 that includes plots 150A, 150B, 150C, 150D, 150E, 150F, 150G, and 150H illustrating the operation of, for example, pixel 100 in accordance with embodiments of the present invention, where pixel 100 is capable of performing correlated double sampling (CDS) with a pipelined readout. Plots 150A, 150B, 150C, 150D, 150E, 150F, 150G, and 150H illustrate reset voltage $V_{RES}$, transfer voltage $V_{TRN}$, sampling voltage $V_{SAM}$, pulsed source follower voltage $V_{SF\_PUL}$, calibration voltage $V_{CAL}$, select voltage $V_{SEL}$, sample/hold signal $V_{SHS}$, and sample/hold reset signal $V_{SHR}$ over time t. Plots 150A, 150B, 150C, and 150D illustrate the frame overhead time, plot 150E illustrates a combination of the frame overhead time and the read overhead time, and plots 150F, 150G, and 150H illustrate the row overhead time. By way of example, pulsed source follower voltage $V_{SF\_PUL}$ ranges from a low voltage level of about voltage $V_{SS}$ and a high voltage level of about $V_{PIX}$. The description of FIG. 3 applies to reading out rows of a pixel such as, for example, rows 0 and 1 of a pixel array. In accordance with embodiments, pixel 100 operates in two phases: sampling of the reset value and sampling of the signal value. Still referring to FIG. 3, before time $t_0$, photodiode 16 is reset via floating diffusion capacitance 124. After resetting photodiode 16, integration or frame capturing begins.

At time $t_1$, sampling voltage $V_{SAM}$ transitions to a logic high voltage level, turning on sampling transistor 130, calibration voltage $V_{CAL}$ transitions to a logic high voltage level, turning on calibration transistor 136, pulsed source follower voltage $V_{SF\_PUL}$ transitions to a low voltage level, turning off source follower transistor 122, and reset voltage and transfer voltages $V_{RES}$ and $V_{TRN}$ remain at voltage level $V_{AB}$. At time $t_2$, pulsed source follower voltage $V_{SF\_PUL}$ transitions to a high voltage level and at time $t_3$, reset voltage $V_{RES}$ transitions to a logic high voltage level, turning on reset transistor 120 and resetting the floating diffusion capacitance voltage, i.e., the voltage at node 126, to about the voltage value of source of operating potential $V_{PIX}$. It should be noted that resetting node 126 to about the voltage level of operating potential $V_{PIX}$ introduces kTC noise into the voltage at node 126 having a root mean square (rms) value given by EQT. 1:

$$V_{fdnrms} = (k*T/C_{fd})^{1/2} \qquad \text{EQT. 1}$$

where:
k is Boltzmann's constant;
T is the temperature in degrees Kelvin; and
$C_{fd}$ is the floating diffusion capacitance in Farads.

Because sampling voltage $V_{SAM}$ is at a logic high voltage level and the voltage at the drain electrode of source follower transistor 122 is at a high voltage level, the reset value, including the kTC noise is sampled on capacitors 132 and 134. At the beginning of the sampling period, i.e., time $t_1$, capacitors 132 and 134 were precharged to erase their previous sampled voltages and to enable source follower transistor 122 to sample a new voltage. Precharging of capacitors 132 and 134 is accomplished by pulsing the drain electrode of source follower transistor 122 to a low voltage level at the beginning of the sampling period. Thus, decreasing pulsed source follower voltage $V_{SF\_PUL}$ to a low voltage level serves to precharge capacitors 132 and 134. Alternatively, capacitors 132 and 134 can be precharged by including a separate precharge transistor (transistor 202 shown in FIG. 4) and including a precharging step (plot 250D shown in FIG. 5). In response to the reset sampling period, calibration transistor 136 is off, which samples the reset value on capacitor 132 while the terminal of capacitor 134 at node 135 is calibrated to a DC voltage, i.e., the voltage of source of operating potential $V_{PIX}$ in accordance with this embodiment.

At time $t_4$, reset voltage $V_{RES}$ transitions to a logic low voltage level and at time $t_5$ pulsed source follower voltage $V_{SF\_PUL}$ transitions to a low voltage level and back to a high voltage level at time $t_6$. At times $t_7$ and $t_8$, calibration voltage $V_{CAL}$ and sampling voltage $V_{SAM}$ transition to logic low voltage levels, respectively.

At time $t_9$, transfer voltage $V_{TRN}$ transitions to a logic high voltage level enabling charge transfer from photodiode 16 to floating diffusion node 126. In accordance with embodiments in which the photodiode is fully depleted after transfer of the charge, the charge transfer is substantially noiseless. Thus, the new voltage at floating diffusion node 126 has substantially the same reset kTC noise as the voltage that was sampled in response to the reset sampling. The floating diffusion voltage after charge transfer is given by EQT. 2 as:

$$V_{fdtransfer} = V_{PIX} - \Delta V_{kTC\_fd} - V_{tSF122} - \Delta V_{signal} \qquad \text{EQT. 2}$$

where:
$V_{PIX}$ is the source of operating potential $V_{PIX}$;
$\Delta V_{kTC\_fd}$ is the kTC noise due to the reset of the floating diffusion capacitance;
$V_{tSF122}$ threshold voltage of source follower transistor 122; and
$\Delta V_{signal}$ is the voltage drop on the floating diffusion due to the charge transfer and may be given as $Q_{charge\_pd}/C_{fd}$.

At time $t_{10}$, transfer voltage $V_{TRN}$ transitions to a logic low voltage level and at time $t_1$ pulsed source follower voltage $V_{SF\_PUL}$ transitions to a low voltage level and sampling voltage $\overline{V}_{SAM}$ transitions to a logic high voltage level. In response to the voltage levels of voltages $V_{SF\_PUL}$ and $V_{SAM}$, the floating diffusion voltage at floating diffusion node 126 is sampled across capacitor 132. The voltage across capacitor 132 decreases from its previous reset value to a new value in accordance with the amount of charge transferred. Because the terminal of capacitor 134 coupled to transistors 136 and 138 is floating during this sampling phase, the amount of charge on capacitor 134 remains substantially constant compared to the voltage across this capacitor during the reset sampling phase. The voltage at node 135 decreases from its calibrated voltage, e.g., $V_{PIX}$, by about the same amount as the voltage at node 131 decreases because of the conservation of charge across capacitor 132. It should be noted that the reset noise is absent from node 135 because it is calibrated to a fixed DC voltage, e.g., $V_{PIX}$, when the reset noise is sampled during the reset sampling phase. Thus, kTC noise and threshold voltage variations of source follower transistor 122 will be absent from the output signal of pixel 100. Accordingly, pixel 100 is capable of performing correlated double sampling in a single readout, which enables low noise high speed imaging.

At time $t_{12}$ pulsed source follower voltage $V_{SF\_PUL}$ transitions to a high voltage level and at time $t_{13}$ sampling voltage $V_{SAM}$ transitions to a logic low voltage level.

At time $t_{14}$, photodiode 16 is reset by reset voltage $V_{RES}$ and transfer voltage $V_{TRN}$ transitioning to logic high voltage levels. In response to voltages $V_{RES}$ and $V_{TRN}$ being at logic high voltage levels, photodiode 16 is reset and floating diffusion capacitor 124 is charged to a voltage level approximately equal to operating potential $V_{PIX}$. At time $t_{15}$, voltages $V_{RES}$ and $V_{TRN}$ transition to logic low voltage levels.

At time $t_{16}$ a pipelined readout of the previously captured frame begins in response to select voltage $V_{SEL}$ transitioning from a logic low voltage level to a logic high voltage level. Sample/hold signal $V_{SHS}$ transitions from a logic low voltage level to a logic high voltage level at time $t_{17}$ and back to a logic low voltage level at time $t_{18}$.

Timing diagram 150 illustrates that optionally double sampling can be performed by raising voltages $V_{SAM}$ and $V_{CAL}$ from a logic low voltage level to a logic high voltage level at time $t_{19}$. Raising voltage $V_{CAL}$ to a logic high voltage level resets the voltage across capacitor 134 in preparation for the second sampling. Sample/hold reset signal $V_{SHR}$ transitions from a logic low voltage level to a logic high voltage level at time $t_{20}$ and back to a logic low voltage level at time $t_{21}$. At time $t_{22}$ signals $V_{SAM}$ and $V_{SEL}$ transition to a logic low voltage level and at time $t_{23}$ select voltage signal $V_{SEL}$ transitions to a logic low voltage level.

It should be noted that the absence of a continuous load lowers power consumption of pixels such as, for example, pixel 100. In addition, sampling occurs on sampling capacitor 132, which is a buffered capacitor, thereby improving parasitic storage node leakage (PSNL) and parasitic light sensitivity (PSL). Precharging of capacitors 132 and 134 can be accomplished by pulsing the drain electrode of source follower transistor 122. The photodiode dark current is decreased in embodiments in which the front end is a 4T front end.

Figure 4:
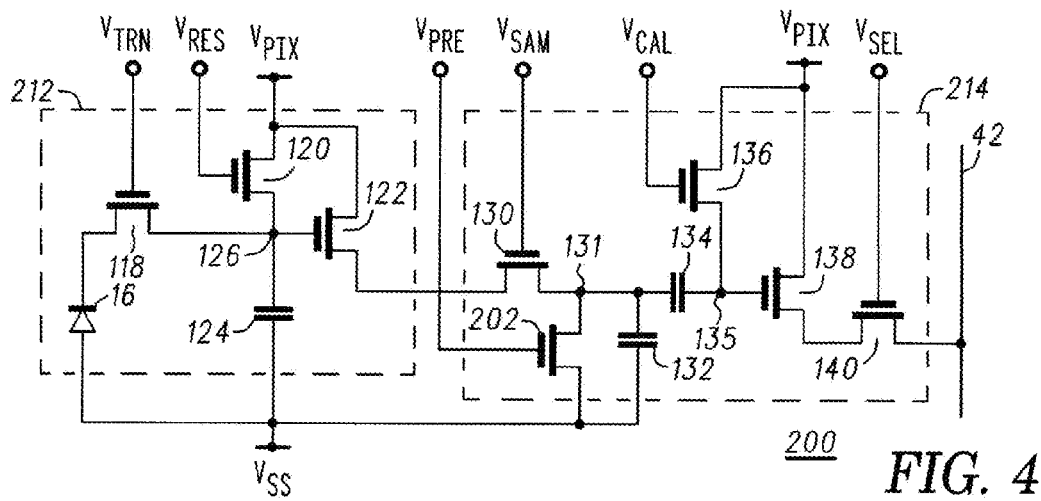
FIG. 4 is a circuit schematic of a pixel in accordance with another embodiment of the present invention.

FIG. 4 is a circuit schematic of a pixel 200 in accordance with another embodiment of the present invention. Pixel 200 is comprised of a front end stage 212 connected to a back end stage 214. In accordance with an embodiment, front end stage 112 includes a photodiode 16, a transfer transistor 118, a reset transistor 120, a transistor 122 configured as a source follower, and a capacitor 124. Preferably, photodiode 16 is a pinned photodiode capable of being fully depleted at a depletion voltage $V_{PIN}$. Transistors 118, 120, and 122 each have a control electrode and a pair of current carrying electrodes. As discussed above, the control electrode of a field effect transistor may be a gate electrode and the current carrying electrodes of the field effect transistor may be the drain and source electrodes. By way of example, transfer transistor 118 has a drain electrode connected to a cathode of photodiode 16 and a source electrode commonly connected to the source electrode of reset transistor 120, a gate electrode of source follower transistor 122, and a terminal of capacitor 124 to form a node 126. The drain electrode of reset transistor 120 and the drain electrode of source follower transistor 122 are coupled for receiving a source of operating potential such as, for example, $V_{PIX}$. The gate electrode of transfer transistor 118 is coupled for receiving a control signal $V_{TRN}$ and the gate electrode of reset transistor 120 is coupled for receiving a control signal $V_{RES}$. The cathode of photodiode 16 and the other terminal of capacitor 24 are coupled for receiving a source of operating potential $V_{SS}$. By way of example, source of operating potential $V_{SS}$ is a ground potential.

Back end 114 includes a sampling transistor 130, a precharge transistor 202, a sampling capacitor 132, a subtraction capacitor 134, a calibration transistor 136, a transistor 138 configured as a source follower, and a selection transistor 140. In accordance with embodiments in which transistors 130, 136, 138, 140, and 202 are field effect transistors, such as, for example, Metal Oxide Semiconductor field effect transistors, they each have a gate electrode, a drain electrode, and a source electrode. Sampling transistor 130 has a drain electrode connected to a source electrode of source follower transistor 122, a source electrode commonly connected to terminals of sampling capacitor 132 and subtraction capacitor 134, and a gate electrode coupled for receiving a sampling signal $V_{SMP}$. Precharge transistor 202 has a gate electrode coupled for receiving a precharge voltage $V_{PRE}$, a drain electrode commonly connected to the source electrode of sampling transistor 130, and the commonly connected terminals of capacitors 132 and 134, and a source electrode coupled for receiving a source of operating potential such as, for example, voltage $V_{SS}$. Source follower transistor 138 has a gate electrode commonly connected to a terminal of subtraction capacitor 134, a drain electrode coupled for receiving a source of operating potential $V_{PIX}$, and a source electrode. Calibration transistor 136 has a source electrode commonly connected to the commonly gate electrode of transistor 138 and the terminal of subtraction capacitor 134. In addition, calibration transistor 136 has a gate electrode coupled for receiving a calibration signal $V_{CAL}$. Selection transistor 140 has a drain electrode connected to the source electrode of source follower transistor 138, a source electrode coupled to a column conductor 42, and a control electrode coupled for receiving a control signal $V_{SEL}$.

Figure 5:
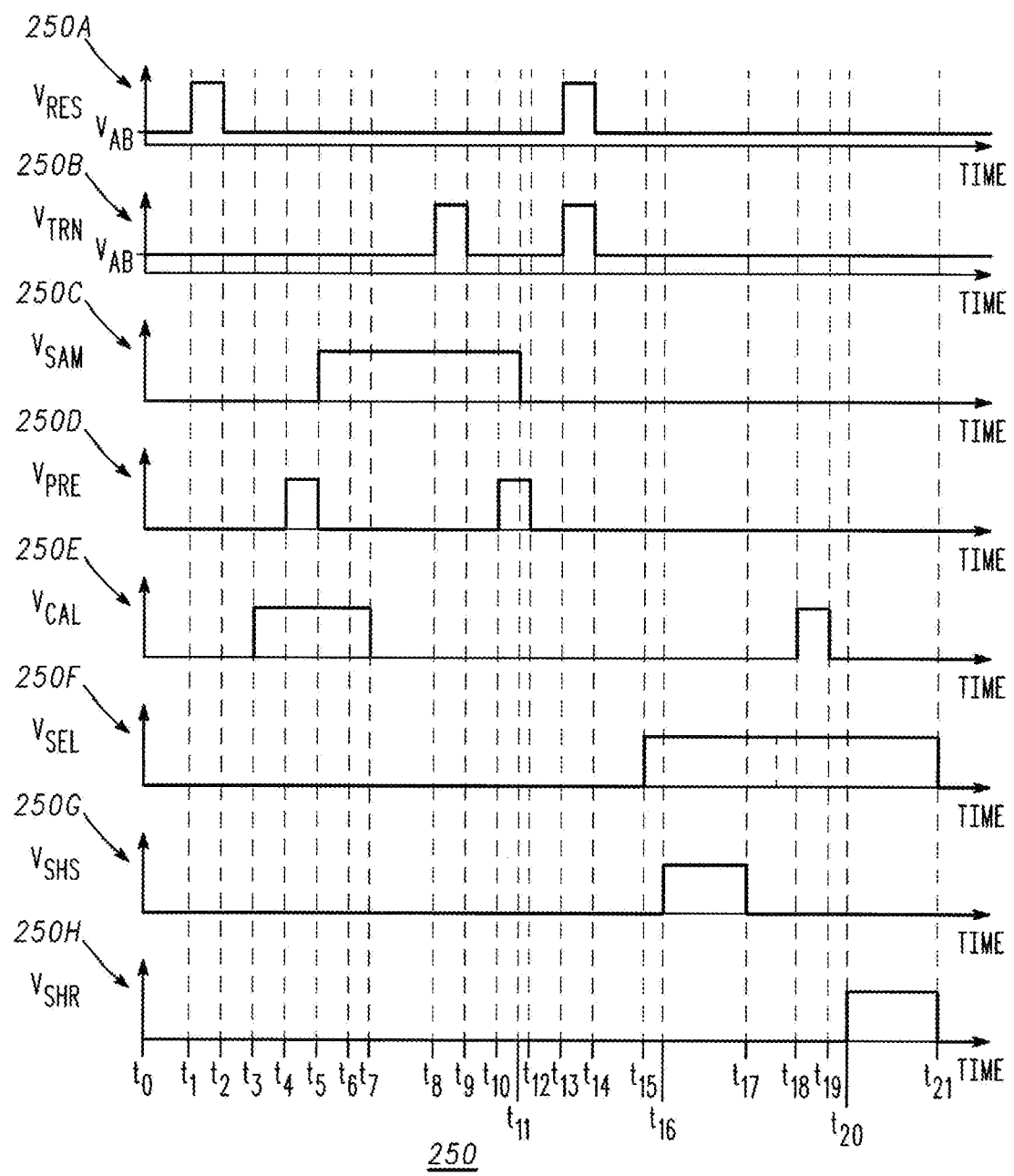
FIG. 5 is a timing diagram in accordance with another embodiment of the present invention.

FIG. 5 is a timing diagram 250 that includes plots 250A, 250B, 250C, 250D, 250E, 250F, 250G, and 250H illustrating the operation of, for example, pixel 200 in accordance with embodiments of the present invention, where pixel 200 is capable of performing correlated double sampling (CDS) with a pipelined readout. Plots 250A, 250B, 250C, 250D, 250E, 250F, 250G, and 250H illustrate reset voltage $V_{RES}$, transfer voltage $V_{TRN}$, sampling voltage $V_{SAM}$, precharge voltage $V_{PRE}$, calibration voltage $V_{CAL}$, select voltage $V_{SEL}$, sample/hold signal $V_{SHS}$, and sample/hold reset signal $V_{SHR}$ over time t. It should be noted that the description of FIG. 5 applies to reading out rows of a pixel such as, for example, rows 0 and 1 of a pixel array. Like pixel 100, pixel 200 may operate in two phases: sampling of the reset value and sampling of the signal value. Still referring to FIG. 5, before time $t_0$, photodiode 16 is reset via floating diffusion capacitance 124. After resetting photodiode 16, integration or frame capturing begins.

The operation of pixel 200 is similar to that of pixel 100 except that a source follower pulse signal $V_{SF\_PUL}$ is used to precharge capacitors 132 and 134 in pixel 100 whereas a precharge signal $V_{PRE}$ from precharge circuit 202 is used to precharge capacitors 132 and 134 in pixel 200.

FIG. 6 is a circuit schematic of a pixel 300 in accordance with another embodiment of the present invention. Pixel 300 is comprised of a front end stage 212 connected to a back end stage 302. Front end stage 212 has been described with reference to FIG. 4.

Back end stage 302 includes a sampling transistor 130, a calibration transistor 304, a sampling capacitor 132, a subtraction capacitor 134, a calibration transistor 136, a transistor 138 configured as a source follower, and a selection transistor 140. In accordance with embodiments in which transistors 130, 136, 138, 140, and 304 are field effect transistors, they each have a gate electrode, a drain electrode, and a source electrode. Sampling transistor 130 has a drain electrode connected to a source electrode of source follower transistor 122, a source electrode commonly connected to terminals of sampling capacitor 132 and subtraction capacitor 134 at node 131, and a gate electrode coupled for receiving a sampling signal $V_{SAM}$. Calibration transistor 304 has a gate electrode coupled for receiving a calibration voltage $V_{CAL}$, a drain electrode commonly connected to the gate electrode of source follower transistor 138 and a terminal of capacitor 134 at node 135, and a source electrode coupled to column conductor 42. Source follower transistor 138 has a gate electrode commonly connected to a terminal of subtraction capacitor 134, a drain electrode coupled for receiving a source of operating potential $V_{PIX}$, and a source electrode. Selection transistor 140 has a drain electrode connected to the source electrode of source follower transistor 138, a source electrode connected to a column conductor 42, and a control electrode coupled for receiving a control signal $V_{SEL}$.

A column precharge circuit 306 and a column calibration circuit 308 are connected to column conductor 42. By way of example, column precharge circuit 306 may be comprised of a current source 310 coupled to column conductor 42 through a switch 312 and column calibration circuit 308 may be comprised of a voltage source 314 coupled to column conductor 42 through a switch 316.

Figure 7:
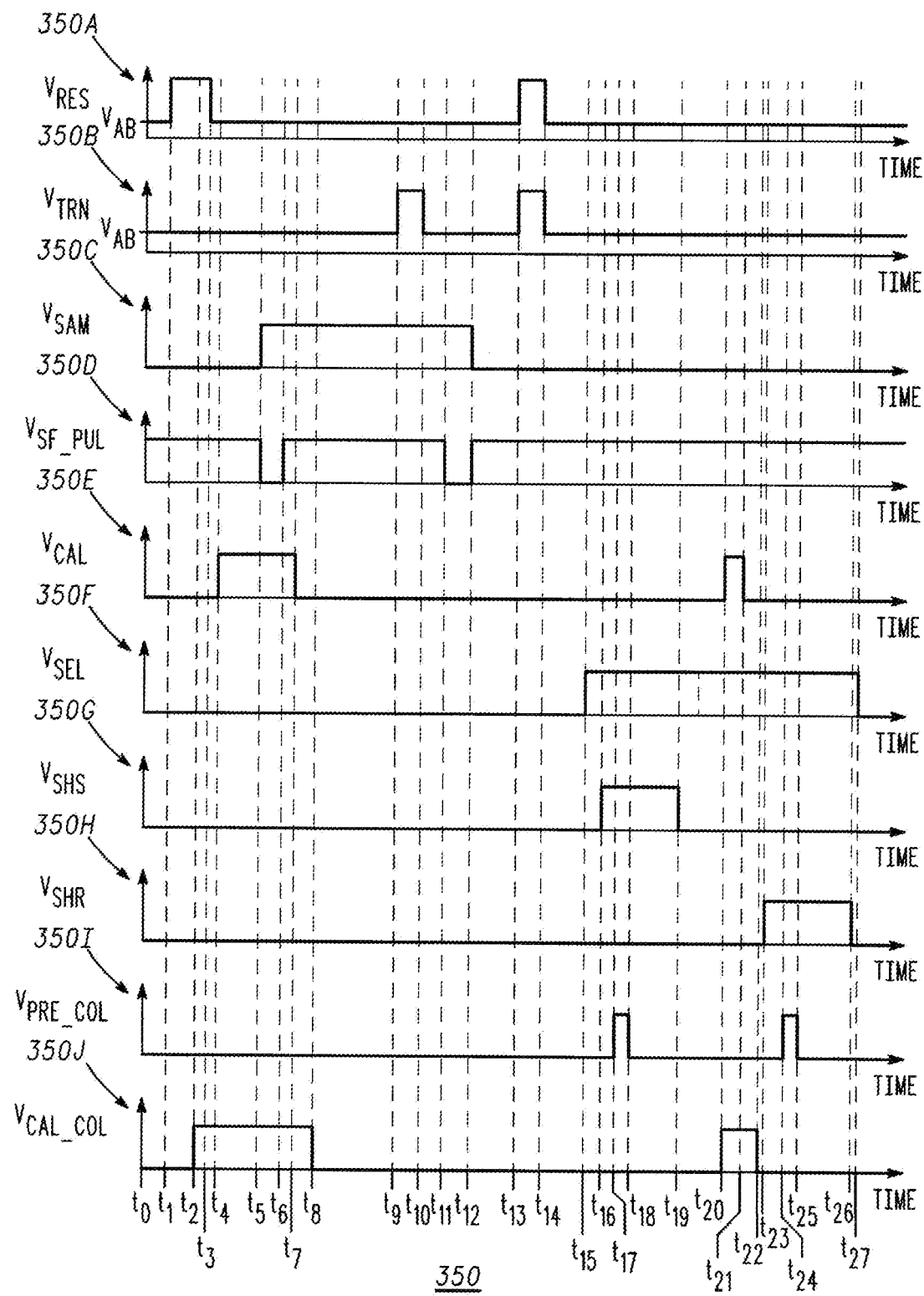
FIG. 7 is a timing diagram in accordance with another embodiment of the present invention.

FIG. 7 is a timing diagram 350 that includes plots 350A, 350B, 350C, 350D, 350E, 350F, 350G, 350H, 350I, and 350J illustrating the operation of, for example, pixel 300 in accordance with embodiments of the present invention, where pixel 300 is capable of performing correlated double sampling (CDS) with a pipelined readout. Plots 350A, 350B, 350C, 350D, 350E, 350F, 350G, 350H, 350I and 350J illustrate reset voltage $V_{RES}$, transfer voltage $V_{TRN}$, sampling voltage $V_{SAM}$, pulsed source follower voltage $V_{SF\_PUL}$, calibration voltage $V_{CAL}$, select voltage $V_{SEL}$, sample/hold signal $V_{SHS}$, sample/hold reset signal $V_{SHR}$, column precharge voltage $V_{PRECOL}$, and column calibration signal $V_{CALCOL}$ over time t. It should be noted that the description of FIG. 7 applies to reading out rows of a pixel such as, for example, rows 0 and 1 of a pixel array. In accordance with embodiments, pixel 300 may operate in two phases: sampling of the reset value and sampling of the signal value. Still referring to FIG. 7, before time $t_0$, photodiode 16 is reset via floating diffusion capacitance 124. After resetting photodiode 16, integration or frame capturing begins.

FIG. 8 is a circuit schematic of a pixel 400 in accordance with another embodiment of the present invention. Pixel 400 is comprised of a front end stage 212 connected to a back end stage 402. Front end stage 212 has been described with reference to FIG. 4.

Back end stage 402 includes a sampling transistor 130, a sampling capacitor 132, a subtraction capacitor 134, a source follower transistor 138, and a selection transistor 140, which have been described with reference to FIGS. 2 and 4. In addition, back end stage 402 includes a mode select transistor 406 having a control electrode coupled for receiving a mode select signal $V_{MODESEL}$, a drain electrode coupled to the commonly connected source and drain electrodes of source follower transistor 122 and sampling transistor 130, and a source electrode connected to column conductor 42. In accordance with embodiments in which transistors 130, 136, 138, 140, and 304 are field effect transistors, they each have a gate electrode, a drain electrode, and a source electrode.

A column precharge circuit 408 is connected to column conductor 42. By way of example, column precharge circuit 408 is comprised of a current source 410 coupled to column conductor 42 through a switch 412. A column current source 414 is connected to column conductor 42 and serves as a column calibration circuit.

By now it should be appreciated that a new pixel topology and method have been provided. In accordance with embodiments, the pixel includes a front end and a back end, where the front end can be a 3T pixel, a 4T pixel, a 5T pixel, a 6T pixel, etc. Pixels in accordance with embodiments of the present invention are capable of performing in-pixel correlated double sampling with snapshot operation and pipelined operation while exhibiting an improved shutter efficiency, i.e., parasitic light sensitivity (PLS), lower leakage of the sample and hold capacitor, i.e., improved parasitic storage node leakage (PSNL), lower power consumption, and a lower dark current. In accordance with an embodiment, a reset value is sampled, a signal value is sampled, and a readout signal is generated in response to the sampled reset and signal values.

The pixel can operate in a single readout mode or a double readout mode.

It should be noted that pixels 10, 100, 200, 300, and 400 are typically a pixel in an array of pixels that are formed in rows and columns.

Although specific embodiments have been disclosed herein, it is not intended that the invention be limited to the disclosed embodiments. Those skilled in the art will recognize that modifications and variations can be made without departing from the spirit of the invention. It is intended that the invention encompass all such modifications and variations as fall within the scope of the appended claims.

What is claimed is:

1. A pixel, comprising:
   a first stage comprising:
      a photodiode having a cathode and an anode;
      a first switch having a control terminal and first and second current carrying terminals, the first current carrying terminal coupled to the cathode of the photodiode;
      a first transistor having a control terminal and first and second current carrying terminals, the control terminal coupled for receiving a first source of potential, the first current carrying terminal coupled for receiving a second source of potential, and the second current carrying terminal coupled to the second current carrying terminal of the first switch;
      a first amplifier having a first input terminal, a second input terminal, and an output terminal, the first input terminal coupled to the second current carrying terminal of the first switch, and the second input terminal coupled to a third source of potential that is different from the first source of potential and configured for precharging a sampling element; and
      a memory element coupled to the input terminal of the first amplifier; and
   a second stage comprising:
      a second switch having a control electrode and first and second current carrying terminals;
      the sampling element having first and second terminals, the first terminal coupled to the second current carrying terminal of the second switch, the sampling element configured to be precharged by pulsing the third source of potential that is coupled to the second input terminal of the first amplifier; and
      a subtraction element having first and second terminals, the first terminal coupled to the first terminal of the sampling element and the second current carrying terminal of the second switch.

2. The pixel of claim 1, wherein the second stage further comprises a second amplifier having an input terminal and an output terminal, the input terminal coupled to the subtraction element.

3. The pixel of claim 2, wherein the second amplifier comprises a field effect transistor configured as a source follower.

4. The pixel of claim 3, wherein the second stage further includes a third switch having a control electrode and first and second current carrying terminals, the control electrode coupled for receiving a first control signal, the first current carrying terminal coupled to the input terminal of the second amplifier and the second current carrying terminal coupled to a column conductor.

5. The pixel of claim 4, further including a column precharge circuit coupled to the column conductor and a column calibration circuit coupled to the column conductor.

6. The pixel of claim 5, wherein the column precharge circuit comprises a fourth switch and a current source, the current source coupled to the column conductor through the fourth switch.

7. The pixel of claim 2, wherein the second stage further comprises:
   a third switch having a control terminal and first and second current carrying terminals, the control terminal coupled for receiving a first control signal, the first current carrying terminal coupled for receiving a first source of operating potential, and the second current carrying terminal coupled to the input terminal of the second amplifier; and
   a fourth switch having a control terminal and first and second current carrying terminals, the control terminal coupled for receiving a second control voltage, the first current carrying terminal coupled to the output terminal of the second amplifier, and the second current carrying terminal coupled to a column conductor.

8. The pixel of claim 7, wherein the third and fourth switches comprise transistors.

9. The pixel of claim 1, wherein the first and second switches comprise transistors.

10. The pixel of claim 1, wherein the first amplifier comprises a field effect transistor configured as a source follower.

11. The pixel of claim 1, further including a third switch having a control electrode and first and second current carrying terminals, the first current carrying terminal coupled to the first current carrying terminal of the second switch, and the second current carrying terminal coupled to the column conductor.

12. The pixel of claim 1, wherein the photodiode is a pinned photodiode.

13. The pixel of claim 1, wherein the second stage further includes a third switch having a control electrode and first and second current carrying terminals, the control electrode coupled for receiving a first control signal, the first current carrying terminal coupled to the second current carrying terminal of the second switch and the second current carrying terminal coupled for receiving a first source of operating potential.

14. An image sensor, comprising:
  a photodiode having a first electrode and a second electrode;
  a transfer switch having a control terminal and first and second conduction terminals, the first conduction terminal coupled to the first electrode of the photodiode;
  means for storing charge coupled to the second conduction terminal of the transfer switch to form a floating diffusion node;
  a reset switch having a first terminal coupled for receiving a first source of potential, a second terminal coupled to the first electrode of the photodiode, and a third terminal coupled for receiving a second source of potential that is different from the first source of potential;
  a first amplification means having a first terminal, a second terminal, and a third terminal, the first terminal of the first amplification means coupled to the floating diffusion node and the third terminal of the first amplification means coupled to a third source of potential that is different from the first source of potential and the third source of potential and configured for precharging a sampling element;
  a sampling switch having a control terminal and first and second conduction terminals, the first conduction terminal of the sampling switch coupled to the second terminal of the first amplification means;
  a second amplification means having a first terminal, a second terminal, and a third terminal, the first terminal of the second amplification means coupled to the second conduction terminal of the sampling switch; and
  the sampling element having a first terminal and a second terminal, first terminal commonly coupled to the sampling switch and to the second amplification means, the sampling element configured to be precharged in response to pulsing the third source of potential coupled to the third terminal of the first amplification means.

15. The image sensor of claim 14, further including a subtraction element coupled between the second conduction terminal of the sampling switch and the first terminal of the second amplification means.

16. The image sensor of claim 15, further including:
  a select switch having a control terminal and first and second conduction terminals, the first conduction terminal coupled to the second terminal of the second amplification means;
  a column conductor, the second conduction terminal of the select switch coupled to the column conductor; and
  a column precharge circuit coupled to the column conductor.

17. A pixel, comprising:
  a memory element having a first terminal;
  a first amplifier having a first terminal, a second terminal, and a third terminal, the first terminal of the first amplifier coupled to the first terminal of the memory element and the second terminal coupled to a second source of potential that is different from the first source of potential and configured for precharging a sampling capacitor;
  a photodetector having first and second terminals, the first terminal of the photodetector switchably coupled to the first terminal of the amplifier and to the first terminal of the memory element;
  a first transistor having a control terminal, a first current carrying terminal, and a second current carrying terminal, the first current carrying terminal coupled to the first terminal of the memory element and the second current carrying terminal coupled for receiving a first source of potential;
  a subtraction element having first and second terminals, the first terminal of the subtraction element switchably coupled to the second terminal of the first amplifier; and
  a second amplifier having a first terminal, a second terminal, and a third terminal, the first terminal of the second amplifier; and
  a column conductor switchably coupled to the second terminal of the second amplifier.

18. The pixel of claim 17, wherein the subtraction element is a capacitor and further including:
  the sampling capacitor coupled to the subtraction element; and
  a calibration transistor having a control electrode and first and second current carrying electrodes, the first current carrying electrode coupled to the first terminal of the second amplifier and the second terminal coupled to the column conductor.

* * * * *